US010791272B1

(12) United States Patent
Kunjachan et al.

(10) Patent No.: US 10,791,272 B1
(45) Date of Patent: Sep. 29, 2020

(54) IMAGE CORRECTION BY EXPECTED LOCATION OF SYMBOLS FOR DOCUMENT SCANNING AND DATA EXTRACTION

(71) Applicant: INTUIT INC., Mountain View, CA (US)

(72) Inventors: George Chiramattel Kunjachan, San Jose, CA (US); Ajith Kuttappan Rajeswari, Mountain View, CA (US); Josh Burson, Scotts Valley, CA (US); Ann Catherine Jose, San Jose, CA (US)

(73) Assignee: INTUIT INC., Mountain View, CA (US)

( * ) Notice: Subject to any disclaimer, the term of this patent is extended or adjusted under 35 U.S.C. 154(b) by 25 days.

(21) Appl. No.: 16/018,857

(22) Filed: Jun. 26, 2018

(51) Int. Cl.
*H04N 5/232* (2006.01)
*H04N 5/262* (2006.01)
*G06K 9/00* (2006.01)

(52) U.S. Cl.
CPC ..... *H04N 5/23267* (2013.01); *G06K 9/00456* (2013.01); *G06K 9/00463* (2013.01); *G06K 9/00469* (2013.01); *H04N 5/2628* (2013.01)

(58) Field of Classification Search
CPC ............ H04N 5/23267; H04N 5/2628; G06K 9/00469; G06K 9/00463; G06K 9/00456
See application file for complete search history.

(56) References Cited

U.S. PATENT DOCUMENTS 10,262,432 B1 * 4/2019 Keilholz ................. G06T 7/62
2014/0307110 A1 * 10/2014 Liu ..................... H04N 5/23267
348/208.1

* cited by examiner

*Primary Examiner* — Christopher Wait
(74) *Attorney, Agent, or Firm* — DLA Piper LLP (US)

(57) ABSTRACT

A camera may capture data. A processor in communication with the camera may detect a plurality of symbols in one or more frames in the data. The processor may determine an expected sequence of the plurality of symbols and an expected orientation of each of the plurality of symbols. The processor may determine a position and orientation of each of the one or more frames based on at least one of the symbols visible in the frame. The processor may correct errors in the one or more frames. The processor may arrange a plurality of frames with respect to one another based on the determined positions and orientations. The processor may stitch the plurality of arranged frames into an image.

20 Claims, 10 Drawing Sheets

IMAGE CORRECTION BY EXPECTED LOCATION OF SYMBOLS FOR DOCUMENT SCANNING AND DATA EXTRACTION

DETAILED DESCRIPTION OF SEVERAL EMBODIMENTS

Embodiments described herein may be configured to scan documents, such as receipts, to create images of the documents and/or to extract data from the documents. Although the embodiments herein are described with respect to receipts, they may be employed with any documents, such as invoices, checks, other financial documents, labels, business cards, coupons, other odd sized documents, etc. The images and/or data may be used for traceability in accounting (e.g., to facilitate reimbursements for work-related spending, to record spending for personal account management, and/or for other accounting purposes). Sizes and shapes of receipts and other documents are not necessarily fixed. For example, receipts are long and narrow in many cases. In order to handle any size and/or shape of receipt, disclosed embodiments may acquire one or multiple images of a receipt (e.g., video frames) from a distance at which receipt information is readable and may stitch the images together. To facilitate accurate receipt identification, orientation, and stitching, disclosed embodiments may be configured to recognize receipts marked with symbols enabling fast detection and analysis of the receipts. Accordingly, receipt recognition, orientation, stitching, and/or other processing may be performed by relatively low power devices such as personal mobile devices at high speed and with high accuracy.

Figure 1:
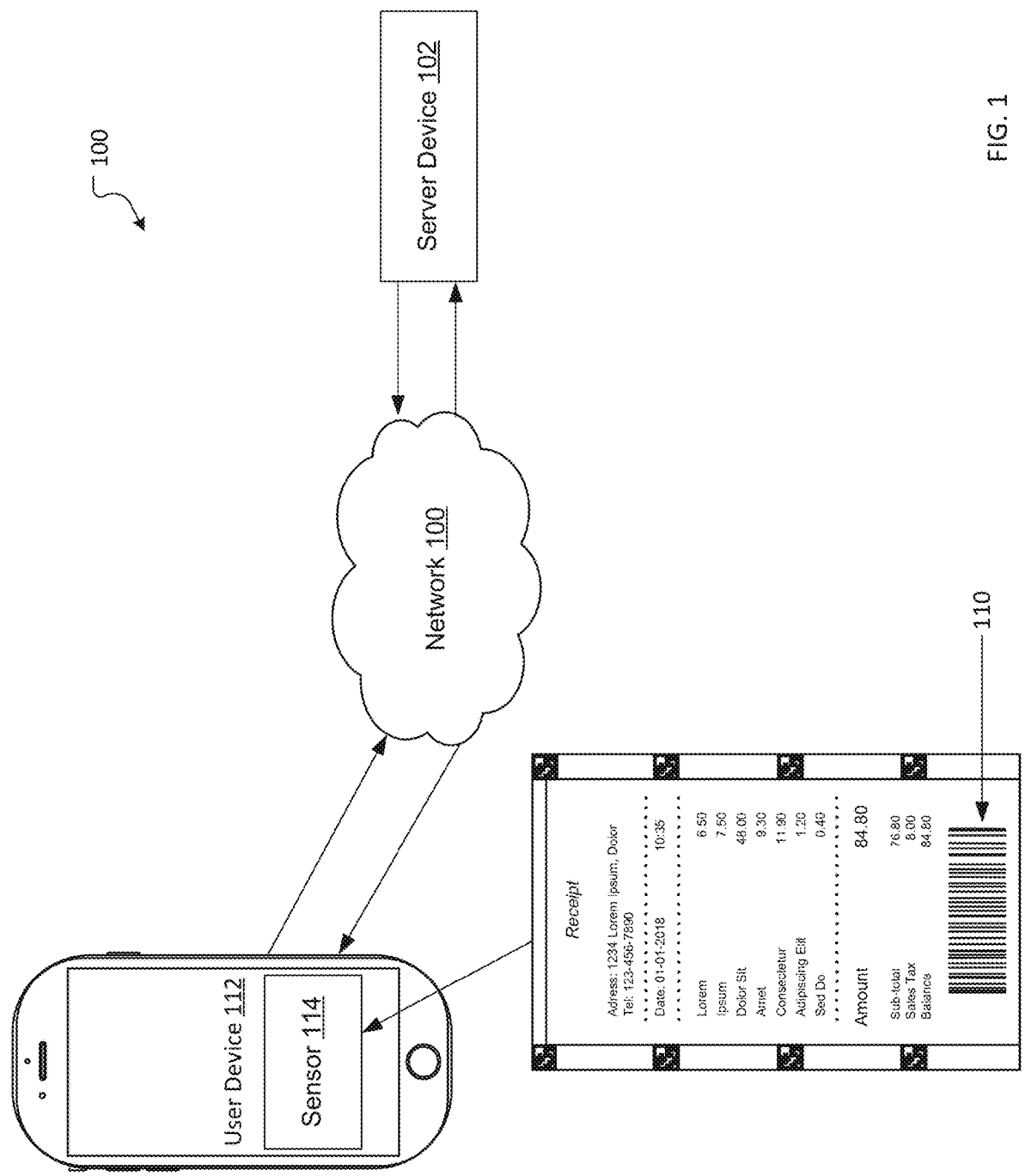
FIG. 1 shows a system configured to scan receipts according to an embodiment of the present disclosure.

FIG. 1 shows a system configured to scan receipts according to an embodiment of the present disclosure. For example, user device 112 may be configured to scan receipt 110. User device 112 may include one or more sensors 114 capable of capturing an image of receipt 110. For example, sensor 114 may be a camera. In some embodiments, user device 112 may present a user interface (UI) for capturing, viewing, and/or submitting receipt 110 to other accounting software on user device 112 or other devices (e.g., server device 102). Processes and/or features related to recognizing, capturing, and processing receipts 110 are described in detail below. User device 112 is depicted as a single portable device for ease of illustration, but those of ordinary skill in the art will appreciate that user device 112 may be embodied in different forms for different implementations. For example, a plurality of user devices 112 may be connected to network 100, and/or user device(s) 112 may be any type of computing device, such as a laptop, personal computer, tablet, etc. In some embodiments, user device 112 may communicate the results of receipt 110 scanning to server device 102 through network 100 (e.g., to submit receipt information for reimbursement or other accounting purposes). Network 100 may include the Internet and/or another public and/or private network. In other embodiments user device 112 itself may perform all processing described below. Sensor 114 may be integrated in user device 112, it may be attached to user device 112 or it may be separate from user device 112.

Figure 2:
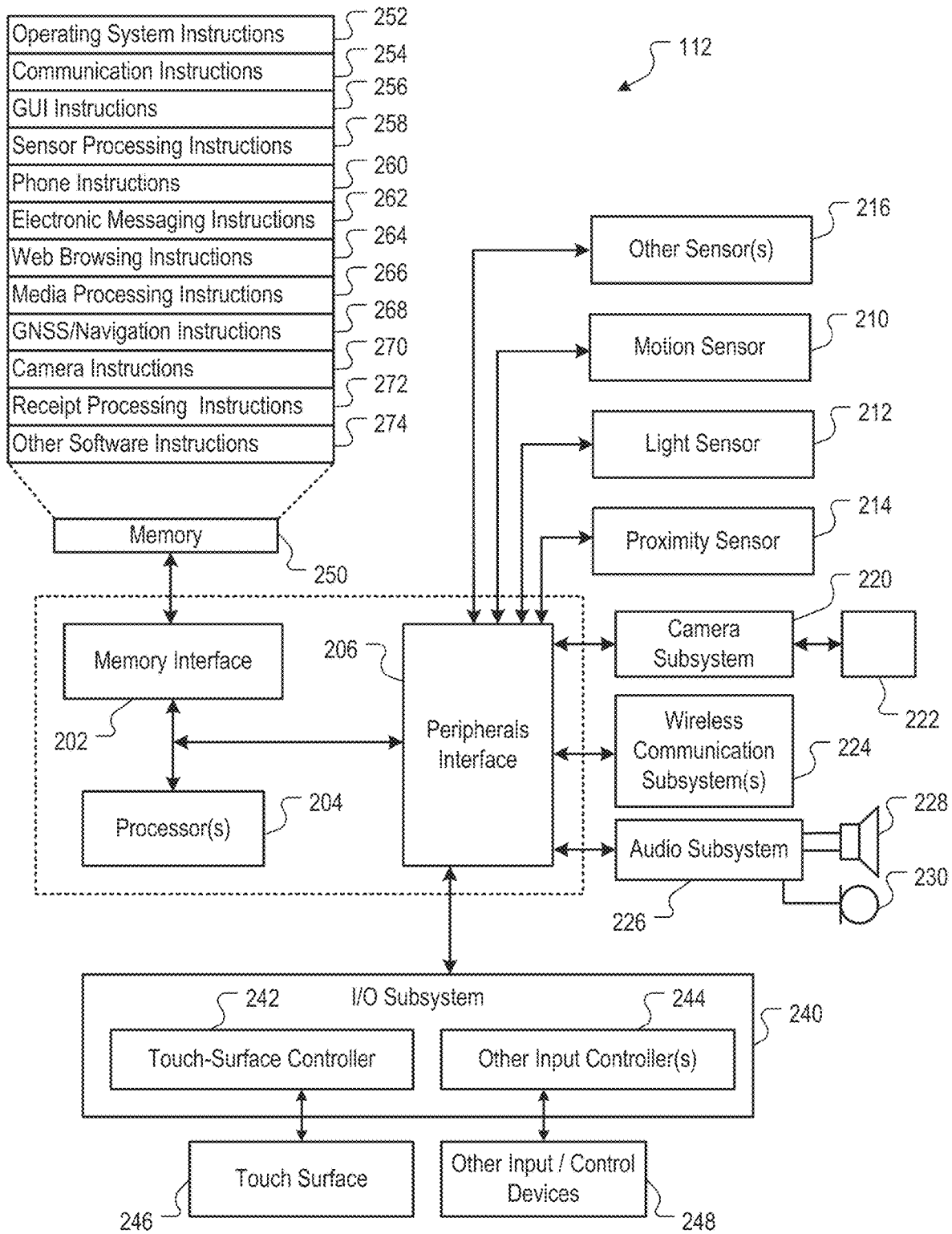
FIG. 2 shows a scanning device according to an embodiment of the present disclosure.

FIG. 2 shows a scanning device according to an embodiment of the present disclosure, for example a computing device configured to function as user device 112 (e.g., a smartphone, tablet, or other camera-equipped computing device). For example, user device 112 may be configured to scan receipts and generate representations thereof as described herein. The user device 112 may include a memory interface 202, one or more data processors, image processors, and/or central processing units 204, and a peripherals interface 206. The memory interface 202, the one or more processors 204, and/or the peripherals interface 206 may be separate components or may be integrated in one or more integrated circuits. The various components in the user device 12 may be coupled by one or more communication buses or signal lines.

Sensors, devices, and subsystems may be coupled to the peripherals interface 206 to facilitate multiple functionalities. For example, a motion sensor 210, a light sensor 212, and a proximity sensor 214 may be coupled to the peripherals interface 206 to facilitate orientation, lighting, and proximity functions. Other sensors 216 may also be connected to the peripherals interface 206, such as a global navigation satellite system (GNSS) (e.g., GPS receiver), a temperature sensor, a biometric sensor, magnetometer, or other sensing device, to facilitate related functionalities.

A camera subsystem 220 and an optical sensor 222, e.g., a charged coupled device (CCD) or a complementary metal-oxide semiconductor (CMOS) optical sensor, may be utilized to facilitate camera functions, such as recording photographs and video clips. The camera subsystem 220 and the optical sensor 222 may be used to collect images of a user to be used during authentication of a user, e.g., by performing facial recognition analysis.

Communication functions may be facilitated through one or more wired and/or wireless communication subsystems 224, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 224. The specific design and implementation of the communication subsystems 224 may depend on the communication network(s) over which the user device 112 is intended to operate. For example, the user device 112 may include communication subsystems 224 designed to operate over a GSM network, a GPRS network, an EDGE network, a WiFi or WiMax network, and a Bluetooth™ network. For example, the wireless communication subsystems 224 may include hosting protocols such that the device 120 can be configured as a base station for other wireless devices and/or to provide a WiFi service.

An audio subsystem 226 may be coupled to a speaker 228 and a microphone 230 to facilitate voice-enabled functions, such as speaker recognition, voice replication, digital recording, and telephony functions. The audio subsystem 226 may be configured to facilitate processing voice commands, voiceprinting, and voice authentication, for example.

The I/O subsystem 240 may include a touch-surface controller 242 and/or other input controller(s) 244. The touch-surface controller 242 may be coupled to a touch surface 246. The touch surface 246 and touch-surface controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 246.

The other input controller(s) 244 may be coupled to other input/control devices 248, such as one or more buttons, rocker switches, thumb-wheel, infrared port, USB port, and/or a pointer device such as a stylus. The one or more buttons (not shown) may include an up/down button for volume control of the speaker 228 and/or the microphone 230.

In some implementations, a pressing of the button for a first duration may disengage a lock of the touch surface 246; and a pressing of the button for a second duration that is longer than the first duration may turn power to the user device 112 on or off. Pressing the button for a third duration may activate a voice control, or voice command, module that enables the user to speak commands into the microphone 230 to cause the device to execute the spoken command. The user may customize a functionality of one or more of the buttons. The touch surface 246 can, for example, also be used to implement virtual or soft buttons and/or a keyboard.

In some implementations, the user device 112 may present recorded audio and/or video files, such as MP3, AAC, and MPEG files. In some implementations, the user device 112 may include the functionality of an MP3 player, such as an iPod™. The user device 112 may, therefore, include a 36-pin connector and/or 8-pin connector that is compatible with the iPod. Other input/output and control devices may also be used.

The memory interface 202 may be coupled to memory 250. The memory 250 may include high-speed random access memory and/or non-volatile memory, such as one or more magnetic disk storage devices, one or more optical storage devices, and/or flash memory (e.g., NAND, NOR). The memory 250 may store an operating system 252, such as Darwin, RTXC, LINUX, UNIX, OS X, WINDOWS, or an embedded operating system such as VxWorks.

The operating system 252 may include instructions for handling basic system services and for performing hardware dependent tasks. In some implementations, the operating system 252 may be a kernel (e.g., UNIX kernel). In some implementations, the operating system 252 may include instructions for performing voice authentication.

The memory 250 may also store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GNSS/Navigation instructions 268 to facilitate GNSS and navigation-related processes and instructions; and/or camera instructions 270 to facilitate camera-related processes and functions.

The memory 250 may store receipt processing instructions 272 to facilitate capturing images of receipts, interpreting the images, and generating representations of the receipts from the interpreted images as described below. The memory 250 may also store other software instructions 274, such as web video instructions to facilitate web video-related processes and functions; and/or web shopping instructions to facilitate web shopping-related processes and functions. In some implementations, the media processing instructions 266 may be divided into audio processing instructions and video processing instructions to facilitate audio processing-related processes and functions and video processing-related processes and functions, respectively.

Each of the above identified instructions and applications may correspond to a set of instructions for performing one or more functions described herein. These instructions need not be implemented as separate software programs, procedures, or modules. The memory 250 may include additional instructions or fewer instructions. Furthermore, various functions of the user device 112 may be implemented in hardware and/or in software, including in one or more signal processing and/or application specific integrated circuits.

Figure 3A:
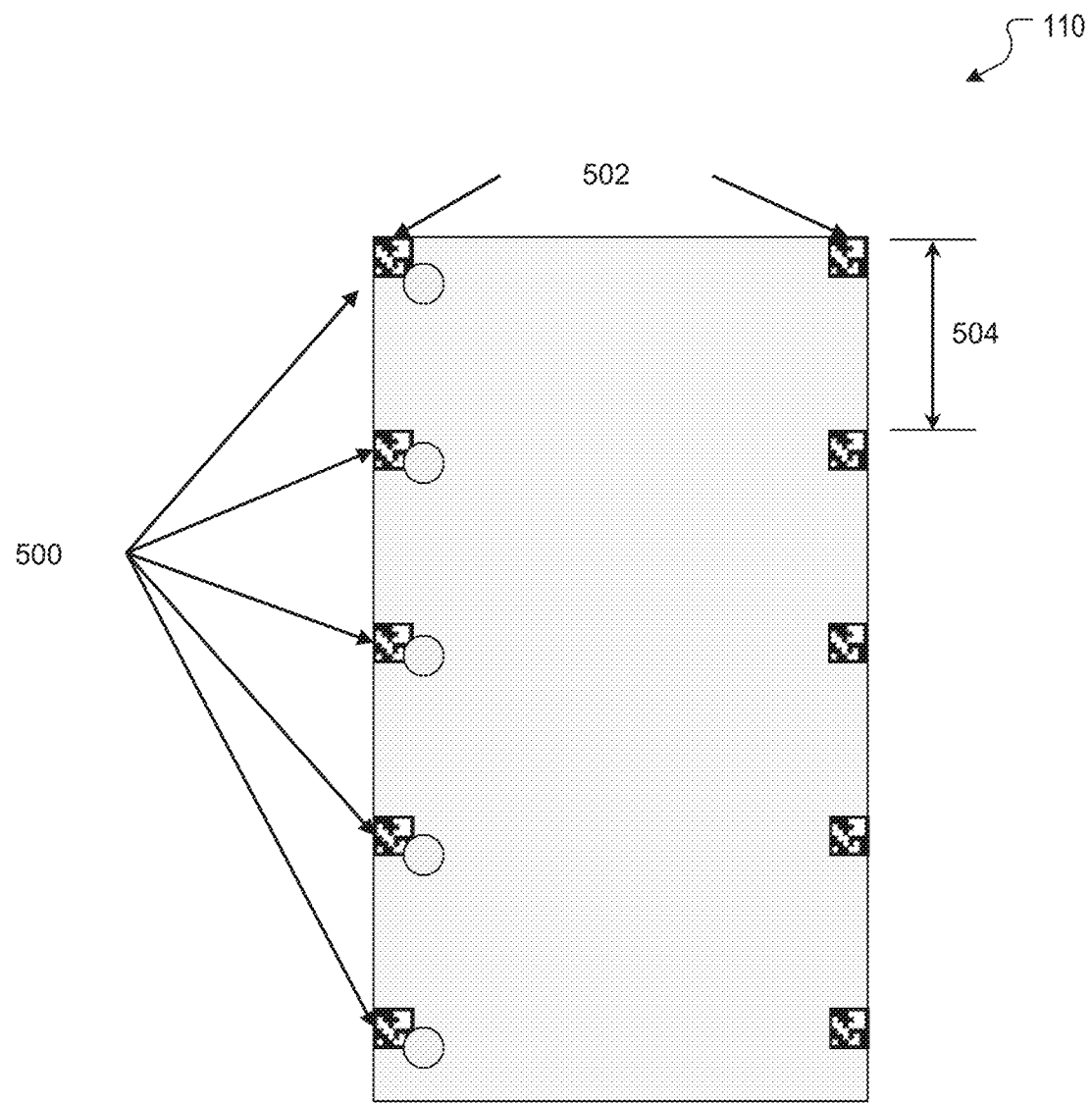
FIGS. 3A-3C show receipts according to an embodiment of the present disclosure.
Figure 3B:
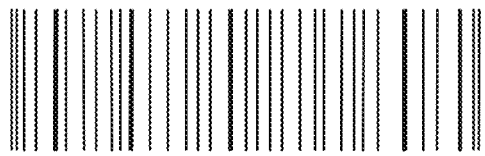
Figure 3C:
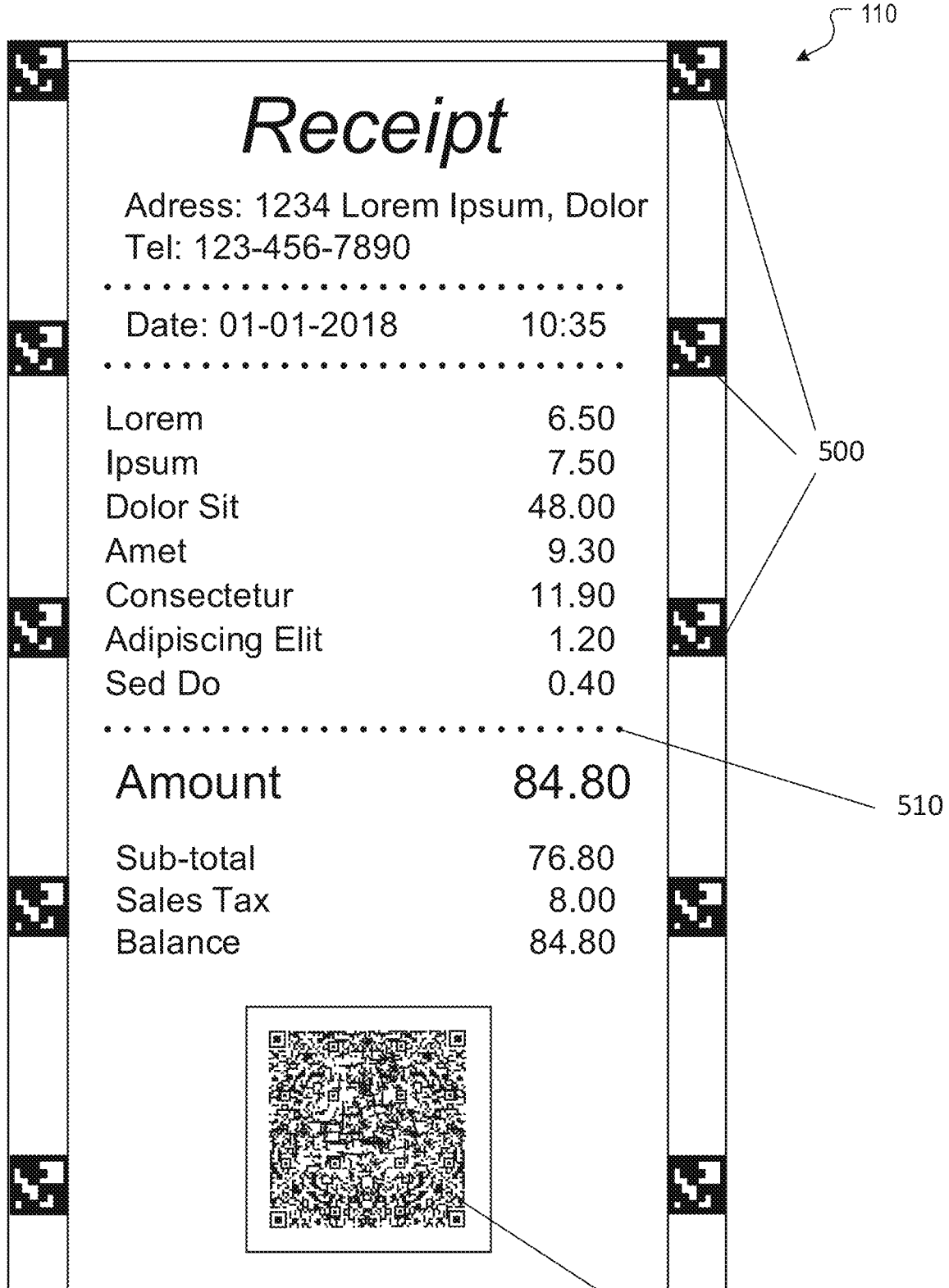

FIGS. 3A-3C show receipts 110 according to an embodiment of the present disclosure. For example, FIG. 3A shows a receipt 110 with a plurality of markers 500 disposed thereon. In some embodiments, receipts may be created on paper with pre-applied markers 500. For example, the paper may be preprinted with markers 500, or markers 500 may be otherwise formed on the paper before the paper is used for printing receipt 110. In some embodiments, markers 500 may be printed with the receipt 110.

Markers 500 may be arranged in a predetermined pattern. For example, as shown in the example of FIG. 3A, markers 500 may be provided in two columns spaced a consistent width 502 from one another. Columns may be disposed along the edges of receipt 110, which may facilitate edge detection of receipt 110 without the need to detect a contrast between receipt 110 and a background (e.g., enabling edge detection even when receipt 110 is placed on a like-colored background). Within each column, markers 500 may be disposed at a consistent distance 504 from one another. Within each column, markers 500 may be arranged in a repeating pattern. For example, in some embodiments, markers 500 may be encoded with data such as numbers. Markers 500 may form an encoded, repeated numeric sequence (e.g., 0-9 or any other numeric sequence). This sequence may be known to user device 120 as an expected sequence of symbols, allowing user device 120 to establish orientation and/or position of images as described below, for example. In some embodiments, markers 500 may be ArUco markers as described in greater detail below, QR codes, or other scannable code elements.

FIG. 3A shows an example of a blank receipt 110 (e.g., prior to being printed with receipt information). FIG. 3B shows an example of a receipt 110 with information 510 printed thereon (e.g., any information that may be printed on a receipt, such as a name and/or contact information for a business, a date and/or time of sale, a list of items paid for with prices paid, subtotals, tax, tips, totals, etc.). FIG. 3C shows an example of a receipt 110 with information 510 and a QR code 520 printed thereon. QR code 520, or another type of scannable code, may encode information 510 printed on the receipt and/or other information.

Figure 3D:
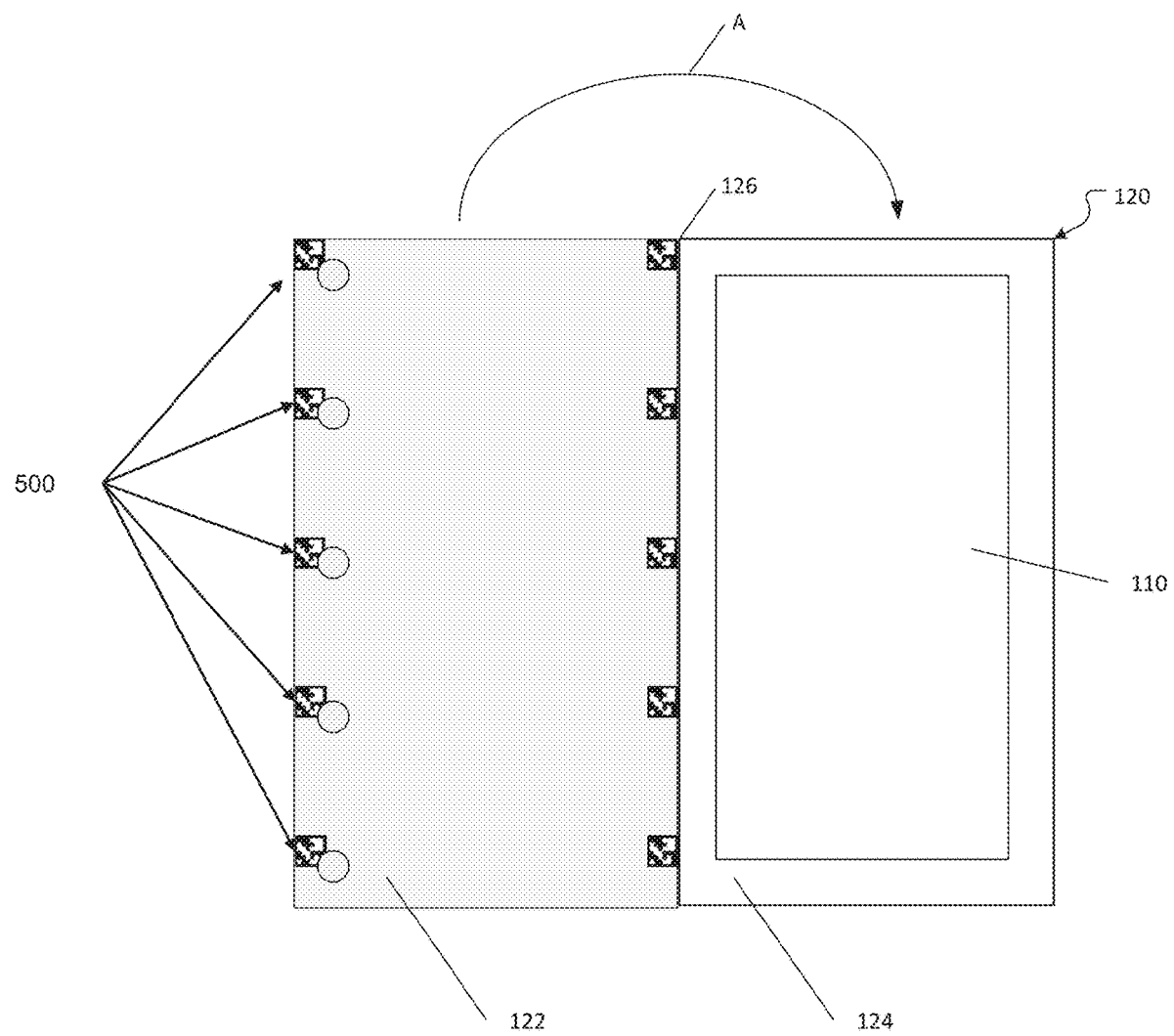
FIG. 3D shows a stencil according to an embodiment of the present disclosure.

FIG. 3D shows a stencil 120 according to an embodiment of the present disclosure. In some embodiments, such as when a receipt 110 is not printed with markers 500 of its own, stencil 120 with markers 500 may be provided for placing atop receipt 110 before image capture. For example, stencil 120, or a portion thereof, may be overlaid on receipt 110 so that receipt text remains visible, but stencil markers 500 are also visible along the periphery of receipt 110.

FIG. 3D shows an example configuration for stencil 120. Stencil 120 may include an overlay portion 122, which may be transparent or semi-transparent, with markers 500 provided thereon in an encoded sequence and in consistently-spaced columns and intervals, much like the markers 500 printed on receipts 110 described above. Stencil 120 may include a backing portion 124, which may be transparent, semi-transparent, or opaque. Overlay portion 122 and backing portion 124 may be separated from one another by a seam or hinge 126, which may be configured to allow overlay portion 122 to be folded over backing portion 124 along arc A. A user may place receipt 110 (e.g., a receipt 110 without markers 500) on backing portion 124 and fold overlay portion 122 over backing portion 124 and receipt 110. When stencil 120 is folded over in this fashion, markers 500 may frame receipt 110 in a similar manner to markers 500 printed on receipt 110 in other embodiments, allowing receipt scanning processing described herein to take place. Furthermore, overlay portion 122 may be pressed down against backing portion 124 with receipt 110 inside to smooth and flatten receipt 110, which may reduce image errors (e.g., discussed below) in some embodiments.

Figure 4A:
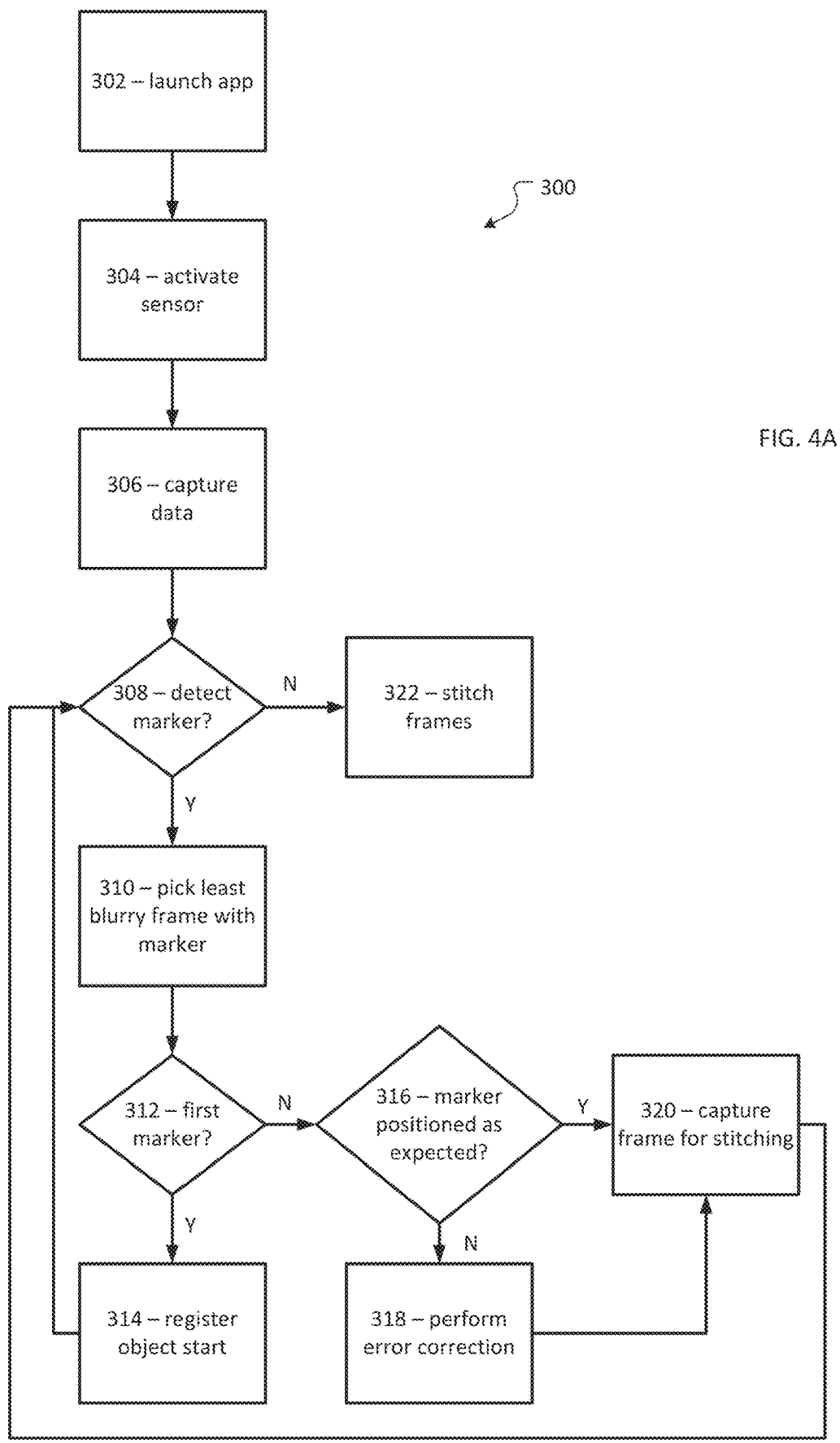
FIGS. 4A-4B show receipt scanning processes according to an embodiment of the present disclosure.

FIG. 4A shows a receipt scanning process 300 according to an embodiment of the present disclosure. User device 112 may perform process 300 to capture and process scanned receipts 110. The first part of process 300 may be for capturing receipt 110 data.

At 302, user device 112 may launch an app from which a receipt 110 may be scanned. For example, user device 112 may include a dedicated receipt scanning app including receipt processing instructions 272, a banking and/or accounting app including receipt processing instructions 272, a camera app including receipt processing instructions 272, or other types of apps including receipt processing instructions 272. In some embodiments, user device 112 may launch the app in response to a user request.

At 304, user device 112 may enable use of sensor 114, which may be a camera. In some embodiments, this may include providing a view of the image being captured by the camera on a screen of user device 112. In some embodiments, user device 112 may activate the camera in response to a user request, such as a request to start scanning a receipt 110. In some embodiments, user device 112 may present instructions to the user on the screen. For example, user device 112 may provide text and/or animation explaining that the user should pan the camera over receipt 110 and may suggest a distance from receipt 110 at which the camera should be placed. In some embodiments, user device 112 may provide an option for capturing a single image, rather than a video. In this case, if the user selects a single image option, user device 112 may switch to process 400 (described below) and pick up process 400 at 406.

At 306, user device 112 may start capturing data with sensor 114. For example, the camera may record video data, and user device 112 may store the video data as a plurality of video frames. In some embodiments, video data may be captured at 60 frames per second or more, and the high video frame rate may reduce motion blur effects in the video frames. The user may drag user device 112 to capture the entire receipt 110 within the video. In some embodiments, sensor 114 may further include an accelerometer, and user device 112 may record accelerometer outputs correlated in time with the video frames. As described below, the accelerometer data may be used to compensate for motion blur. In some embodiments, the user may enter a command to stop capturing the data after capturing the entire receipt 110. In other embodiments, user device 112 may detect that the entire receipt 110 has been captured (e.g., through remaining processing of process 300 described below) and stop capturing the data automatically.

The remaining portions of process 300 may be for detecting receipt 110 within the captured data and/or for creating a stitched image of receipt 110 from a plurality of video frames. In some embodiments, the remaining portions of process 300 may be performed after preceding process elements 302-306 (for example, after receiving the user command to stop capturing the data). In some embodiments, the remaining portions of process 300 may be performed as user device 112 captures data with sensor 114 at 306.

At 308, user device 112 may analyze each frame to detect markers 500. For example, user device 112 may analyze frames as they are generated and/or in the sequence in which they were generated until a marker 500 is detected. User device 112 may process frames with markers included as described below and, when no more markers are detected, user device 112 may stitch frames together to create an image of receipt 110 as described below. By analyzing the frames in sequence, user device 112 may discard or otherwise ignore all frames prior to the first frame in which a marker 500 is detected. However, it may not be necessary to analyze frames in sequential order.

At 310, user device 112 may examine frames close in sequence to the frame in which the first marker 500 was detected to determine whether any other frames contain the same marker 500. For example, the next several frames in the sequence may include the same marker 500, because user device 112 may capture frames quickly enough that the user did not move beyond the first marker 500 in the time it takes to capture a single frame (e.g., $\frac{1}{60}^{th}$ of a second or greater). User device 112 may compare the frames identified as containing the same marker 500 to select a non-blurred or least blurry frame from among the frames for further processing.

At 312, user device 112 may determine whether the marker 500 detected at 308 is the first marker 500 detected. If so, at 314, user device 112 may register the start of receipt 110. Also, as noted above, previous frames in the sequence may be discarded or ignored. After registering the start of receipt 110, user device 112 may return to 308 and analyze additional frames until a second marker 500 is found.

If the marker 500 detected at 308 is not the first marker 500 detected, at 316, user device 112 may analyze one or more of the frames to determine whether the most recently detected marker 500 is positioned as expected with respect to other marker(s) 200 that are also visible in the one or more frames. The relative positions of markers 500 with respect to one another may indicate positions and/or orientations of the frames themselves. User device 112 may determine whether the most recently detected marker 500 is width distance 202 from a previously detected marker 500 having the same encoded data as the most recently detected marker 500 (e.g., whether the most recently detected marker 500 is width distance 502 from a marker 500 across from it in the other column of markers 500). User device 112 may determine whether the most recently detected marker 500 is length distance 504 from a previously detected marker 500 having different encoded data as the most recently detected marker 500 (e.g., whether the most recently detected marker 500 is length distance 504 from a marker 500 in the same column and next (and/or previous) in the sequence of markers 500). If markers 500 in a frame are the expected distances 502, 504 from one another, this may indicate that the frame is not distorted or blurred. If markers 500 in a frame are at distances from one another different from the expected distances 502, 504, this may indicate that the frame is distorted and/or blurred.

At 318, user device 112 may perform error correction processing on the frame if it is distorted and/or blurred. For example, user device 112 may perform error correction process 600 described in detail below.

At 320, user device 112 may capture the frame for stitching if it is not distorted or blurred or after error correction processing has been performed. User device 112 may return to 308 to analyze additional frames until capture ends (e.g., either by user instruction or because user device 112 stops detecting markers 500 in the frames) or, if frames are being analyzed after capture, until there are no more frames to analyze.

Figure 5:
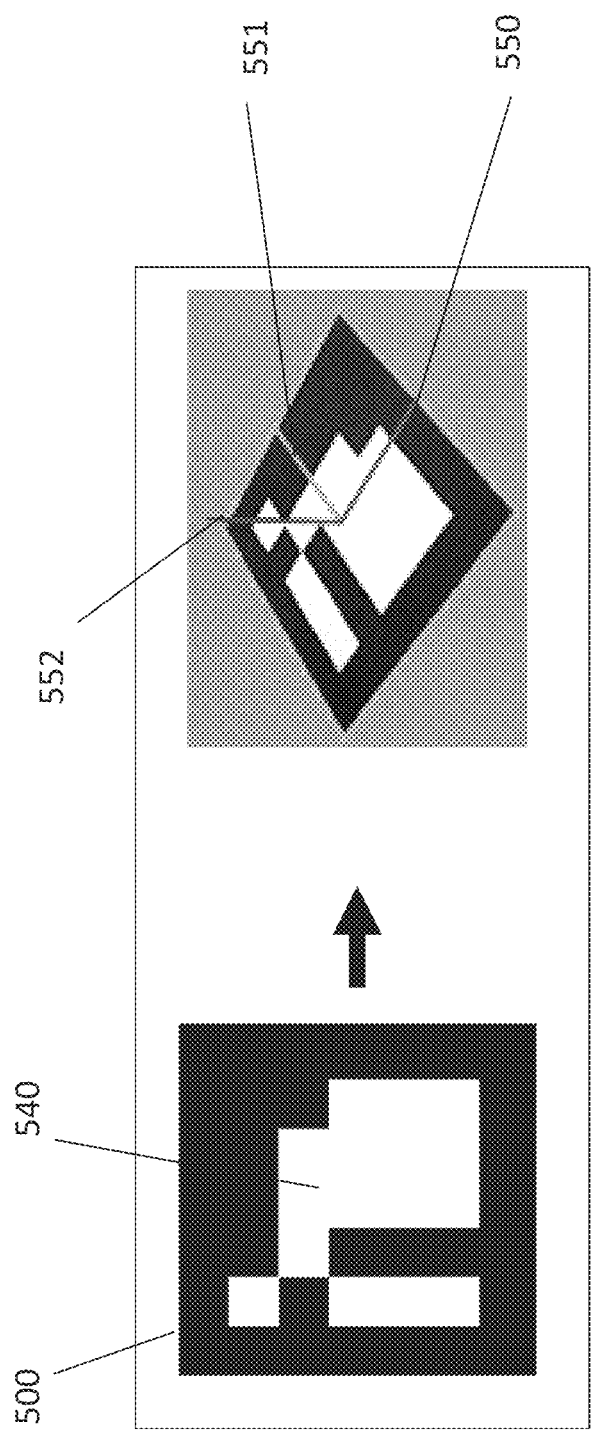
FIG. 5 shows a receipt marker according to an embodiment of the present disclosure.

At 322, user device 112 may create an image of receipt 110 by stitching together frames from 318 and/or 320. User device 112 may use known features of markers 500 to scale and/or orient frames consistently if necessary and stitch together the scaled and/or oriented frames. For example, as shown in FIG. 5, marker 500 may be an ArUco marker or similar marker with a visible symbol 540 and having a predetermined X orientation 550, Y orientation 551, and Z orientation 552.

The example ArUco marker may be a synthetic square marker including a wide black border and a inner binary matrix (e.g., visible symbol 540) which determines its identifier (e.g., its number within the sequence). The black border may facilitate fast detection in a frame, and the binary matrix may allow its identification and the application of error detection and correction techniques. For example, user device 112 may store data in its memory such as a dictionary of symbols enabling recognition of the identity and orientation of visible symbol 540. This may enable positive detection of only symbols that are known (e.g., rejection of white symbols inside black borders on receipt 110 that are not in the dictionary as false positives). This may also enable determination of orientation (e.g., due to known orientation of symbols within the dictionary). Those of ordinary skill in the art may be familiar with detecting identity and orientation of ArUco markers, but it should be understood that different kinds of markers and different detection techniques may be used in place of ArUco markers in some embodiments.

User device 112 may recognize visible symbol 540 and determine what the symbol means (e.g., identify which of numbers 0-9 is represented by visible symbol 540). User device 112 may know a correct orientation for the recognized visible symbol 540 and rotate and/or skew frames to consistently align the X orientation 550, Y orientation 551, and Z orientation 552 of each marker 500. Based on the number represented by visible symbol 540 and thereby encoded in marker 500, user device 112 may identify each marker's 500 position in the sequence of markers 500 printed on receipt 110. Because the sequence may be consistent and repeating, user device 112 may be able to arrange the frames in order. Because all markers 500 may be the same size, user device 112 may scale the frames so that all frames represent markers 500 as being the same size. When all frames to be included in the stitched image are aligned, scaled, and arranged in order, user device 112 may stitch them together to form a complete image of receipt 110. In some embodiments, user device 112 may regard skewed, inconsistently scaled, or inconsistently rotated frames as erroneous frames at 316 and perform error processing on them at 318. In this case, the frames may need no further alignment, scaling, or orientation processing at the stitching stage.

Figure 4B:
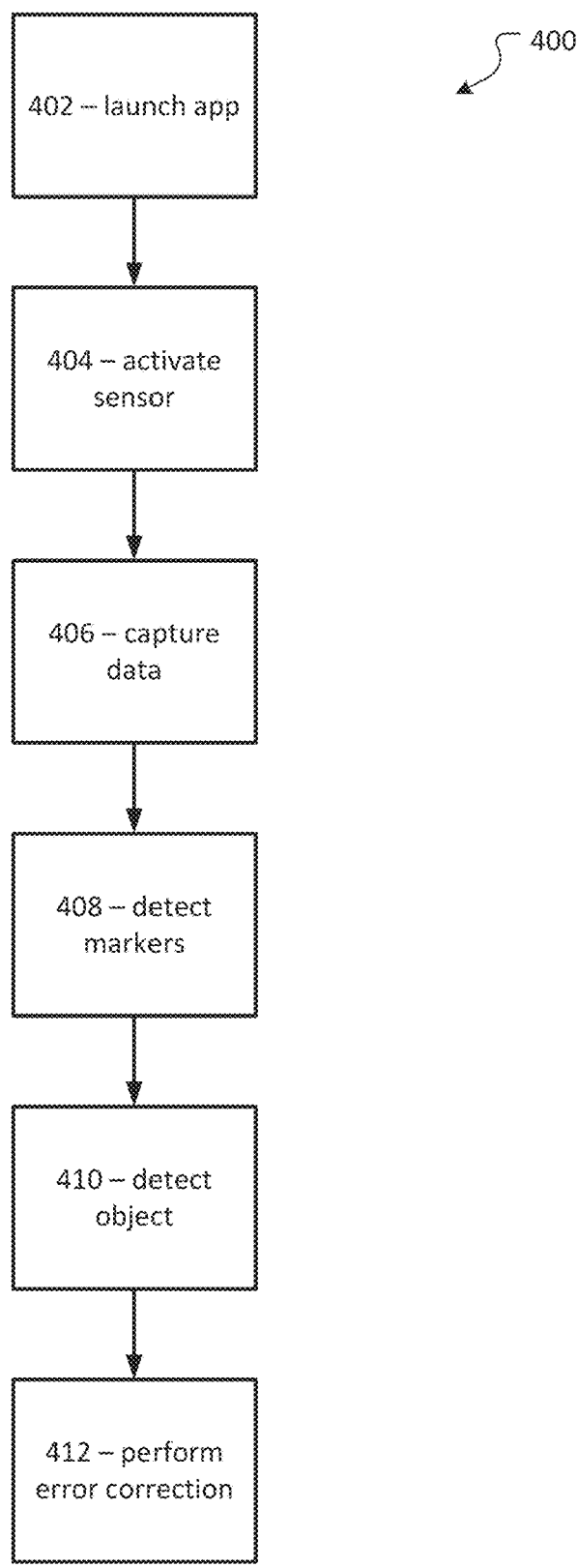

FIG. 4B shows a receipt scanning process 400 according to an embodiment of the present disclosure. User device 112 may perform process 400 to capture and process scanned receipts 110. In some embodiments, user device 112 may use process 300, described above, to capture receipts 110 that do not fit within a single image frame at a distance rendering them legible, or when a user does not know whether the receipt 110 will fit in a single frame, etc. User device 112 may use process 400 to capture and process scanned receipts 110 that fit inside a single image frame. The first part of process 400 may be for capturing receipt 110 data.

At 402, user device 112 may launch an app from which a receipt 110 may be scanned. For example, user device 112 may include a dedicated receipt scanning app including receipt processing instructions 272, a banking and/or accounting app including receipt processing instructions 272, a camera app including receipt processing instructions 272, or other types of apps including receipt processing instructions 272. In some embodiments, user device 112 may launch the app in response to a user request.

At 404, user device 112 may enable use of sensor 114, which may be a camera. In some embodiments, this may include providing a view of the image being captured by the camera on a screen of user device 112. In some embodiments, user device 112 may activate the camera in response to a user request, such as a request to start scanning a receipt 110.

At 406, user device 112 may capture data with sensor 114. In some embodiments, user device 112 may present instructions to the user on the screen. For example, user device 112 may direct the user to capture an image of receipt 110 (e.g., by selecting an option in the UI to take a picture). In some embodiments, user device 112 may provide an option for capturing a video, rather than a single image. In this case, if the user selects a video option, user device 112 may switch to process 300 (described above) and pick up process 300 at 306. In some embodiments, user device 112 may automatically take a picture with the camera after activating the camera. User device 112 may store the image data as a single image.

The remaining portions of process 400 may be for detecting receipt 110 within the captured data and correcting errors within the captured data. At 408, user device 112 may analyze the image to detect markers 500. For example, user device 112 may detect all markers 500 visible in the image and determine their locations within the image and/or with respect to one another.

At 410, user device 112 may detect receipt 110 based on markers 500 detected at 408. For example, user device 112 may analyze each marker 500 or a subset thereof to determine whether the markers 500 are width distance 502 from other markers 500 having the same encoded data and/or length distance 504 from other markers 500 having different encoded data (e.g., whether a marker 500 is length distance 504 from a marker 500 in the same column and next (and/or previous) in a sequence of markers 500). Based on the presence of large areas of the image outside of detected columns and/or sequence starting/ending points, user device 112 may detect receipt 110 as corresponding to the area bounded by markers 500. The relative positions and/or orientations of markers 500 with respect to one another may indicate the orientation of the image itself. Moreover, in some embodiments, if markers 500 in an image are the expected distances 502, 504 from one another, this may indicate that the image is not distorted or blurred. If markers 500 in an image are at distances from one another different from the expected distances 502, 504, this may indicate that the image is distorted and/or blurred.

At 412, user device 112 may perform error correction processing on the image if it is distorted and/or blurred. For example, user device 112 may perform error correction process 600 described in detail below.

Figure 6:
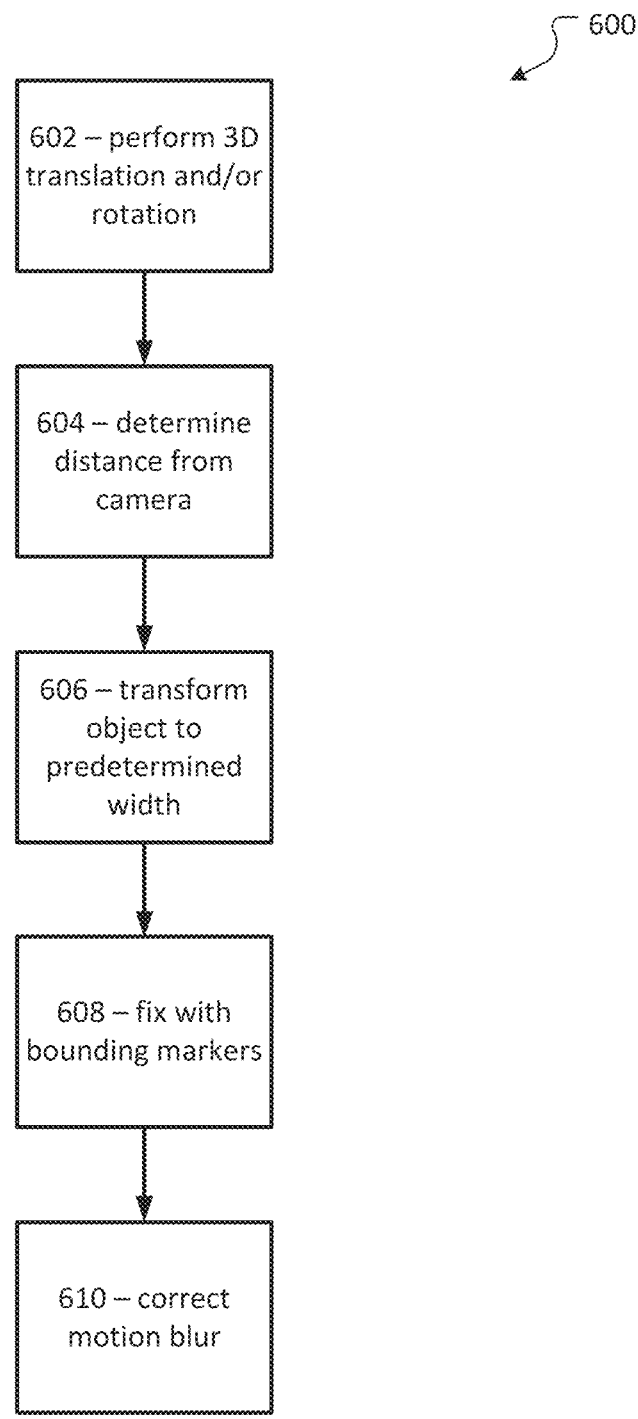
FIG. 6 shows an error correction process according to an embodiment of the present disclosure.

FIG. 6 shows an error correction process 600 according to an embodiment of the present disclosure. User device 112 may perform process 600 in response to detecting distortion and/or blurring at 316 in process 300, for example. User device 112 may perform process 600 separately for each frame selected for inclusion in the stitched image and including one or more errors.

At 602, user device 112 may perform 3D translation and/or rotation on a frame. For example, as shown in FIG. 5, marker 500 may be an ArUco marker or similar marker with a visible symbol 540 and having a predetermined, expected X orientation 550, Y orientation 551, and Z orientation 552. User device 112 may recognize visible symbol 540 and determine what the symbol's orientation should be relative to what it is currently. User device 112 may rotate and/or skew the frame to align the X orientation 550, Y orientation 551, and Z orientation 552 of each marker 500 to a reference alignment that may be used for each frame.

At 604, user device 112 may determine a distance of receipt 110 from the camera in the frame. Because all markers 500 may be the same size, user device 112 may use the size of markers 500 in the frame to determine the distance.

At 606, user device 112 may transform the image of receipt 110 within the frame to a predetermined width. Based on the distance determined at 604, user device 112 may scale the frame so that markers 500 in the frame are all the same size, and are the same size as a reference size consistent for all frames. For example, user device 112 may scale the frame so that distance 502 is set to a predetermined value within the frame.

At 608, user device 112 may fix the frame with bounding markers. For example, based on the positions of detected columns of markers 500, user device 112 may establish bounding markers. For example, the bounding markers may be on the outer edges of markers 500 (e.g., in a vertical direction as defined by the columns of markers 500 and/or on an upper or lower edge of each marker 500). Accordingly, when the frame is later stitched with other frames, user device 112 may line up the bounding markers in two frames to position them relative to one another for stitching.

At 610, user device 112 may correct for motion blur in the frame. For example, as noted above, user device 112 may collect accelerometer data along with the camera data. User device 112 may use one or more known or proprietary motion-blur correcting algorithms to correct the motion blur based on the accelerometer data. In some embodiments, user device 112 may be configured to perform motion blur correction processing as a basic camera feature (e.g., motion blur correction may be built into the camera app included with user device 112).

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of correcting an image comprising:
capturing, by a camera, video data including a plurality of image frames, wherein the plurality of image frames are combined to form an image of a document;
detecting, by a processor in communication with the camera, a plurality of symbols in the image frames;
encoding, by the processor, each symbol in the plurality of symbols with data that identifies a position of each symbol within an expected sequence of symbols;
determining, by the processor, an expected location of each of the plurality of symbols;
determining, by the processor, an orientation and position of an image frame within the image of the document based on a width distance between the expected location of at least two symbols having encoded data that identifies the at least two symbols as having a shared position within the expected sequence of symbols and a length distance between the expected location of at least two symbols having encoded data that identifies the at least two symbols as having a different position within the expected sequence of symbols;
determining, by the processor, that the image frame includes a distortion based on a comparison of the width distance to an expected width distance and a comparison of the length distance to an expected length distance; and
processing, by the processor, the image frame to correct the distortion by scaling the image frame so that the width distance is equal to the expected width distance and the length distance is equal to the expected length distance.

2. The method of claim 1, wherein the expected location includes a disposition in one of a plurality of columns in which the plurality of symbols are disposed, the columns being separated from one another by a predetermined width relative to a size of each symbol.

3. The method of claim 2, wherein determining the orientation includes determining that a plurality of symbols in the image are the predetermined width from one another.

4. The method of claim 3, wherein the determining that the image includes a distortion is based on a width between columns being different from the predetermined width in the image.

5. The method of claim 1, wherein the expected location includes a disposition in one of a plurality of columns in which the plurality of symbols are disposed, the symbols within each column being separated from one another by a predetermined distance relative to a size of each symbol.

6. The method of claim 5, wherein determining the orientation includes determining that a plurality of symbols in the image are the predetermined distance from one another.

7. The method of claim 6, wherein the determining that the image includes a distortion is based on a distance between symbols being different from the predetermined distance in the image.

8. The method of claim 1, further comprising:
capturing, by an accelerometer in communication with the processor, accelerometer data concurrently with the capturing of the image; and
determining, by the processor, that the image includes a motion blur; and
correcting, by the processor, the motion blur based on the accelerometer data.

9. The method of claim 1, wherein determining the orientation includes:
determining an expected X, Y, and Z orientation for at least one of the symbols in the image; and
determining that at least one of a detected X, Y, and Z orientation for the at least one of the symbols is different from the expected X, Y, or Z orientation.

10. The method of claim 1, further comprising detecting, by the processor, an edge of an object in at least one of the frames based on the at least one of the symbols visible in the frame.

11. A computing device comprising:
a camera configured to capture video data including a plurality of image frames, wherein the plurality of image frames are combined to form an image of a document; and
a processor in communication with the camera configured to:
detect a plurality of symbols in the image frames;
encoding each symbol in the plurality of symbols with data that identifies a position of each symbol within an expected sequence of symbols;
determine an expected location of each of the plurality of symbols;
determine an orientation and position of an image frame within the image of the document based on a width distance between the expected location of at least two symbols having encoded data that identifies the at least two symbols as having a shared position within the expected sequence of symbols and a length distance between the expected location of at least two symbols having encoded data that identifies the at least two symbols as having a different position within the expected sequence of symbols;
determine that the image frame includes a distortion based on a comparison of the width distance to an expected width distance and a comparison of the length distance to an excepted length distance; and
process the image frame to correct the distortion by scaling the image frame so that the width distance is equal to the expected width distance and the length distance is equal to the expected length distance.

12. The device of claim 11, wherein the expected location includes a disposition in one of a plurality of columns in which the plurality of symbols are disposed, the columns being separated from one another by a predetermined width relative to a size of each symbol.

13. The device of claim 12, wherein determining the orientation includes determining that a plurality of symbols in the image are the predetermined width from one another.

14. The device of claim 13, wherein the determining that the image includes a distortion is based on a width between columns being different from the predetermined width in the image.

15. The device of claim 11, wherein the expected location includes a disposition in one of a plurality of columns in which the plurality of symbols are disposed, the symbols within each column being separated from one another by a predetermined distance relative to a size of each symbol.

16. The device of claim 15, wherein determining the orientation includes determining that a plurality of symbols in the image are the predetermined distance from one another.

17. The device of claim 16, wherein the determining that the image includes a distortion is based on a distance between symbols being different from the predetermined distance in the image.

18. The device of claim 11, further comprising an accelerometer in communication with the processor configured to capture accelerometer data concurrently with the capturing of the image, wherein the processor is further configured to:
determine that the image includes a motion blur; and
correct the motion blur based on the accelerometer data.

19. The device of claim 11, wherein determining the orientation includes:
determining an expected X, Y, and Z orientation for at least one of the symbols in the image; and
determining that at least one of a detected X, Y, and Z orientation for the at least one of the symbols is different from the expected X, Y, or Z orientation.

20. The device of claim 11, wherein the processor is further configured to detect an edge of an object in at least one of the frames based on the at least one of the symbols visible in the frame.

* * * * *